O. HATLELID.
PLOW ATTACHMENT.
APPLICATION FILED OCT. 31, 1908.
974,377.
Patented Nov. 1, 1910.
2 SHEETS—SHEET 2.
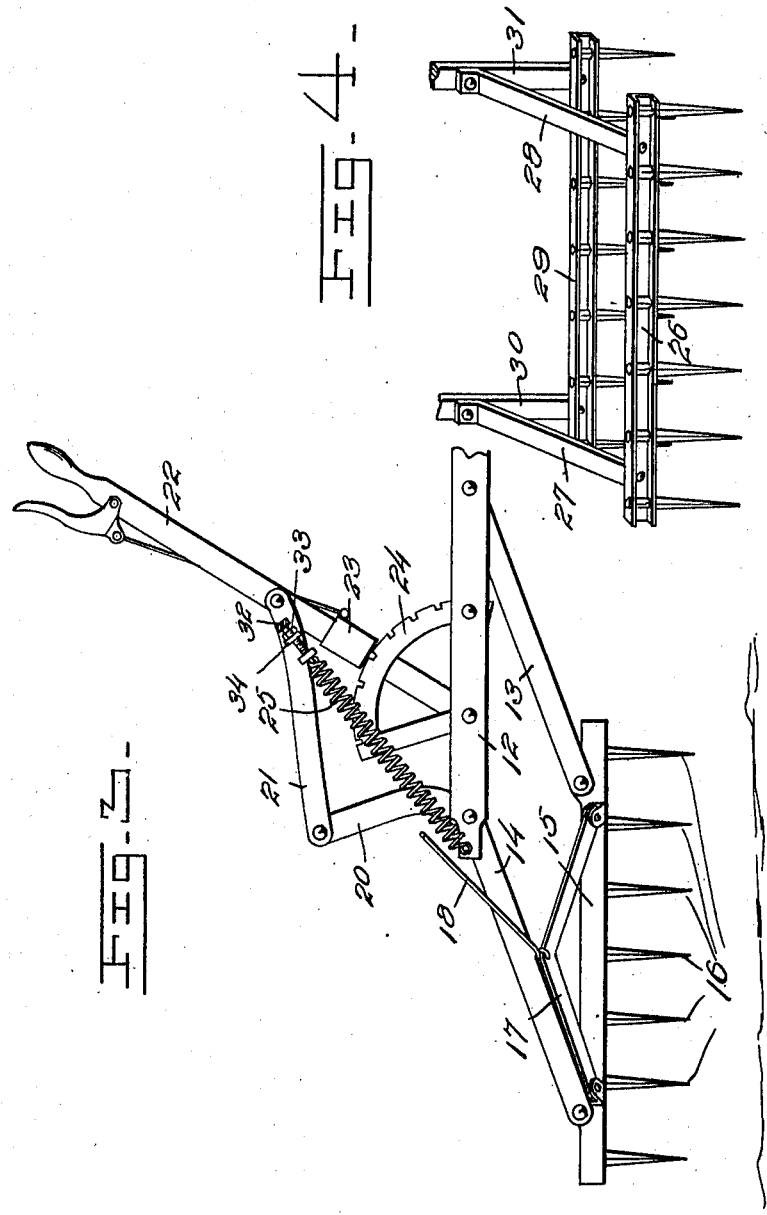

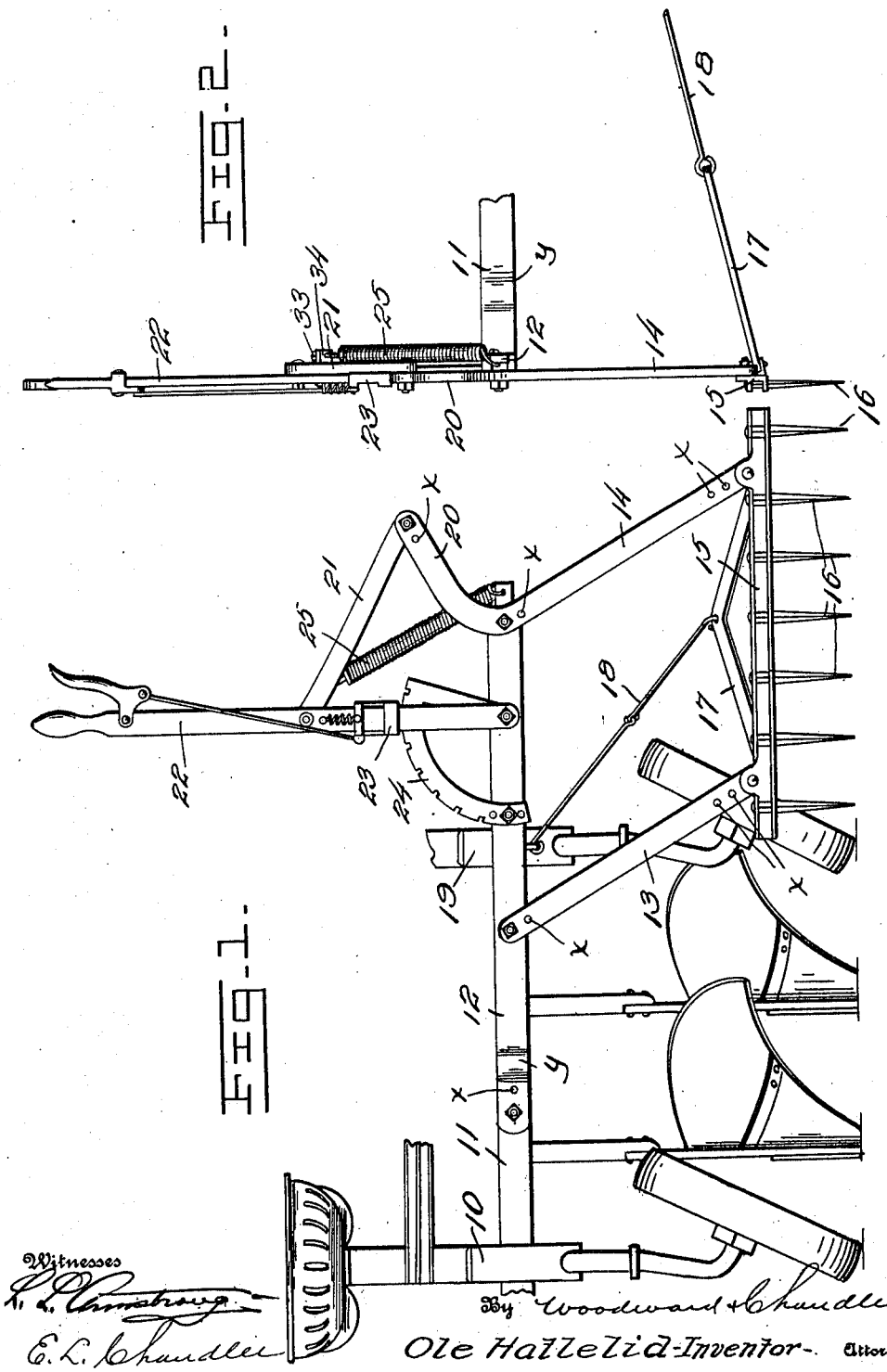

UNITED STATES PATENT OFFICE.

OLE HATLELID, OF LIGNITE, NORTH DAKOTA.

PLOW ATTACHMENT.

974,377.  Specification of Letters Patent.  Patented Nov. 1, 1910.

Application filed October 31, 1908. Serial No. 460,466.

*To all whom it may concern:*

Be it known that OLE HATLELID, a citizen of the United States, residing at Lignite, in the county of Ward and State of North Dakota, has invented certain new and useful Improvements in Plow Attachments, of which the following is a specification.

This invention relates to farm implements and refers particularly to an attachment for a plow.

An object of the invention is to provide a plow with a harrow which can be raised into or out of operation and which can be adjusted in relation to the plow.

The invention has for another object the provision of means whereby the harrow will be rigidly and tensionally held against the ground during the operation of the device.

The invention has for a still further object the provision of a device of this character which is simple in construction and which is strong and durable so that the same will withstand the usages to which such devices are incident.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side view of the device as applied to a plow, Fig. 2 is an end view of the same, Fig. 3 is a side view of the device in a folded position taken in opposite direction to Fig. 1, the plow shown in section, Fig. 4 is a modification of the harrow.

Referring to the drawings, 10 designates a plow frame forwardly of which is a laterally extended beam 11 which hingedly supports at its outer extremity a bar 12. The bar 12 lies normally horizontally and carries depending parallel link arms 13 and 14 which are hingedly supported thereon and which carry across their lower extremities a harrow bar 15, said harrow bar being pivotally connected to the lower ends of said links and being disposed horizontally in parallel relation to the beam at all times. As will be noted said link member 13 is pivotally and adjustably secured to the beam inwardly of one portion of the plow frame and intermediately of the end of the bar, the outer link being pivotally connected to said beam adjacent its outer end and having an outwardly curved extension disposed outwardly of the free end of said beam. The harrow bar 15 carries a plurality of depending teeth 16 and a forwardly extended brace 17. The brace 17 carries the rear extremity of a flexible brace rod 18 which is secured to a part of the plow frame, as 19, and serves the purpose of carrying the drag bar 15 in rigid relation to the bar 12. The arm 14 is provided with an upwardly and outwardly extended short arm 20 which is connected by a link 21 disposed intermediate the ends of the lever and the extremity of the arm and to a hand lever 22 pivotally mounted upon the bar 12 intermediately of the arms 13 and 14. The lever 22 extends upwardly from the bar 12 and is held in adjusted position by means of the engagement of a pawl 23 in a toothed segment 24. Disposed between the outer extremity of the bar 12 and the upper end of the link 21 is a spring 25 which exerts a tension to normally hold the lever 22 in an upright position to depress the drag bar 15 against the ground.

In the modification disclosed in Fig. 4 a second harrow bar 26 is secured by supports 27 and 28 in parallel relation with the harrow bar 29 and is subject to the adjustments of the same. The supports 27 and 28 are secured intermediately upon the depending arms 30 and 31 and are thus held in rigid position by means of the same.

The spring 25 is provided with a set screw 32 which is secured through a lug 34 on the link 21 and jammed in adjusted position by means of the nuts 33 which engage the lug 34 upon the opposite edges thereof. The set screw 32 is employed for the purpose of adjusting the tension of the spring 25 to regulate the adjustment of the drag bar 15.

When the lever 22 is pressed downwardly the link 21 swings the short arm 20 in an upward direction and causes the raising of the arms 13 and 14 owing to their pivotal connection to the drag bar 15.

A plurality of apertures are provided as shown at *x* Fig. 1 for the purpose of obtaining the required adjustment of the same according to the conditions under which the device is operated. The beam 11 may be also curved as shown at *y* Figs. 1 and 2, to enable the same to be applied to plows of different constructions, the form of the same being immaterial to this invention.

It will be seen that by supporting the harrow bar by parallel bars of the construction shown, a rigid harrow attachable to a plow may be obtained.

What is claimed is:—

1. A cultivator attachment for plows comprising, the combination with a plow; of a laterally extending supporting bar pivotally and adjustably carried rearwardly of the plow and extending outwardly therefrom beyond its pivot point to lie in a normally horizontal position, a pendent link pivotally and adjustably secured to the bar inwardly of one portion of the plow frame and intermediately of the ends of the bar, an outer link pivotally connected to said bar adjacent its outer end and depending therefrom in parallel relation to the first named link, said last named link having an upwardly and outwardly curved extension disposed outwardly of the free end of the bar, a harrow member pivoted to the lower ends of said pendent links and disposed horizontally in parallel relation to the bar at all times, a forwardly extending brace carried by the harrow member, a flexible brace rod connecting said brace and the plow frame, a hand lever pivotally mounted upon said bar intermediate the outer link and the frame portion to which said flexible brace is connected, a link pivotally connecting said hand lever and the extremity of the extension, a spring connected to the outer end of the bar and adjustably connected to the link, a segment mounted upon said bar, and a dog carried by said hand lever for engagement with said segment to lock said lever in an adjusted position.

2. In a device of the class described, the combination with a plow; of a beam extending laterally and pivotally connected to the frame of the plow, arms depended from said beam, a harrow device pivotally secured to the lower ends of said arms, an outwardly extended curved arm formed upon the outer of said arms, a hand lever pivotally mounted upon said beam, a link connected to the outer end of said short arm and said hand lever, a spring connected to the outer end of said beam, a lug having a threaded aperture, said lug being carried by the link, a set screw adjustably mounted in said aperture and secured to the upper end of the spring to adjust the tension thereof, nuts mounted on said screw to hold the same in its adjusted position, a segment mounted on said beam, a dog carried by the lever for engagement with said segment and a flexible brace rod connecting the plow frame and the harrow device.

In testimony whereof I affix my signature, in presence of two witnesses.

OLE HATLELID.

Witnesses:
OLE HOLEN,
P. N. JOHNSON.